Patented Jan. 22, 1935

1,988,800

UNITED STATES PATENT OFFICE 1,988,800

CLAY PRODUCTS FOR VITREOUS SLIPS

Charles J. Kinzie, Charles H. Commons, Jr., and Donald S. Hake, Niagara Falls, N. Y., assignors to The Titanium Alloy Manufacturing Company, New York, N. Y., a corporation of Maine No Drawing. Application November 26, 1932, Serial No. 644,486

20 Claims. (Cl. 106—36.2)

Our invention relates to improved methods in the preparation of enamel slips for use in vitreous enameling and glazing, and particularly to improved clay products to be used in setting up such enamel slips whereby the finely ground particles of the enamel frit or glass may be maintained uniformly in suspension; also to improved methods of producing such clay substances as will serve advantageously in such enamel slips by the addition to the clay of water-insoluble hydroxides of metals thereby to improve its plastic properties. We also partially dry the improved clay products before use in such a way as to remove substantially all the water, while retaining the desired plastic properties when our products are embodied in the mill mix in forming the enamel slip.

In the practice of vitreous enameling and glazing, particularly the vitreous enameling on metal by the wet process in which the enamel or glaze frit is milled with water, clay, color, and opacifier additions, it has been the practice to use from 4 to 8% enameling clay at the mill to assist in keeping the glass or frit particles in suspension.

Such clay has the effect of hardening the mixture so that a higher temperature or a longer time of burning is required than would be the case if the amount of clay could be lowered or omitted entirely.

U. S. Patent No. 1,785,777 of December 23, 1930 describes and claims methods for setting up the acid resisting enamel slips particularly of the acid resisting type, in which salts of zirconium or titanium are used in the mill liquor, and the resulting precipitate of the metal hydrate effects a setting up of enamel slip with the suspension of frit particles therein.

In an application for patent filed by one of us June 6, 1931, Serial No. 549,125, it is disclosed that generally better results were obtained if the titanium hydroxide (orthotitanic acid) was prepared separately and freed from incidental salts before adding to the enamel.

Such patent and application for patent referred particularly to the setting up of vitreous enamels of the acid-resisting type, and experiments performed had shown that titanium hydroxide had less detrimental effect upon the acid resistance of the enamel as compared with aluminum hydroxide in acid resisting enamels. For this reason aluminum hydroxide was referred to as being unsuited for this purpose.

During recent years a marked tendency has developed in the trade toward the use of softer (lower firing) vitreous enamels together with a desire to improve their appearance by increasing the lustre and by reducing blemishes in surface through use of purer raw materials and more advanced operating procedures. In case of the generally used enamels (non-acid resisting), one of the common causes of blemishes, such as black specks, etc., is due to the clay used to suspend the milled glass in the vehicle (water). According to present practices the amount of clay commonly used is essential for this purpose.

Our invention comprises, among other things, the discovery of satisfactory means of suspending the enamel glass particles either resulting in the elimination of the clay addition, or in its substantial reduction in amount whereby threefold advantages will result viz: (1) The applied enamel film would mature in shorter time or at lower temperature; (2) the lustre would be increased (as practically all inorganic mill additions detract from lustre); (3) there would be a complete or partial elimination of troubles caused by impurities introduced in the usual clay.

As a result of our investigations carried on along these lines, so as to effect a setting up of enamel slips by means other than the addition of the usual 6% clay, we discovered that small amounts of aluminum hydroxide were very effective, and by the use thereof, the clay addition could be materially reduced with resultant economy due to fact that enamels so set up required a lower temperature or a shorter time to mature and were of a higher lustre and of generally finer quality.

We also discovered that there could be prepared an improved clay product by adding aluminum hydroxide to clay, and the resulting product, when dried according to our invention, may be used in greatly reduced amounts with the benefits we have mentioned. In addition to these advantages we found that the enamels containing the substantially lowered clay content were of a purer white color, or in case of tints and stronger colors, there was a greater purity of tone. This advantage was due to lowering of clay which owing to its impurities, such as iron, etc., caused an undesirable discoloration in the enamel.

Our invention may be practiced in several ways and the initial step of preparing the hydrate compound will be first described.

A water soluble salt of aluminum, such as potash alum $(Al_2(SO_4)_3-K_2SO_4.24-H_2O)$, or else aluminum sulphate, is dissolved in water and precipitated with ammonium hydroxide and is then well washed. Instead of alum or aluminum sulphate there may be used a solution obtained by treating acid soluble compounds of aluminum. The solution so obtained is then treated with ammonia to precipitation of the aluminum as the hydroxide. Clay might be digested with $H_2SO_4$, dissolved in water and then precipitated in the usual manner. In any event the precipitate is essentially freed of water soluble compounds by suitable washing, and the precipitate may then be dewatered to form a stiff paste containing about 4% residue upon ignition. There may also be included titanium or zirconium hydroxide either by having these in solution, and then precipitating same along with the aluminum, or by separately precipitating and later mixing with the aluminum hydroxide.

The aluminum hydroxide either in form of slurry or as a paste can be added to the mill charge, and the following charge will illustrate.

| | Parts by weight |
|---|---|
| Frit | 100 |
| Alum. hydrate paste (4% $Al_2O_3$) | 6.25 |
| Clay | 2 |
| Zirconium oxide | 6 |
| Water | 29 |
| Total | 143.25 |

The charge is milled in usual manner and applied in usual manner, but may be burned on at a somewhat lower temperature or for a shorter time at the temperature commonly used.

The above procedure of application of the aluminum hydrate paste to enamel milling although practical from actual enameling standpoint entails the shipping of considerable water with the aluminum hydroxide. We prefer, therefore, to make our improved clay products in dry form and supply them for use to the enameler in dry form.

In the following complete example, we have referred to aluminum compounds, but other hydrates such as titanium, zirconium, calcium, etc. may be used to replace part of the aluminum. We prefer usually to have the aluminum hydroxide constitute one-half or more of the metal hydrates present, and for ordinary non-acid-resisting enamels either ground or cover coat, we prefer to work with aluminum alone for purposes of economy and simplicity.

In addition to the hydrated compounds above mentioned, there exists the possible application of silicic acid (gelatinous), iron hydroxides, magnesium hydroxide, tin hydroxide, etc. The only limit being that the hydroxide used be active in adding to the plastic or suspending properties of the clay in setting up the enamel slips.

We may practice our invention according to the following example.

Example A (Improved clay for setting up enamels)

Aluminum sulphate $(Al(SO_4)_3.18H_2O)$, 100 parts is dissolved in water, 14,000 parts. To this solution added $NH_3$. The $NH_3$ is preferably first dissolved in water and then added to the solution of aluminum sulphate. Only enough ammonia to completely precipitate the aluminum and make the solution slightly alkaline need be used.

The batch is washed by any suitable means to essentially free it of the ammonium sulphate. If washing is by settling and decantation there will be a settled charge consisting of aluminum hydroxide suspended in water which can be further dewatered by suitable means such as a rotary filter, gravity filter, or centrifugal machine. The paste obtained for this example contains aluminum hydroxide equivalent to 4% $Al_2O_3$ and the amount of the paste will be about 382.5 pounds.

We now take 136 pounds of plastic clay, preferably Illinois Kaolin, and this is charged to a ball mill with about three hundred pounds of water. The ball mill should contain only enough balls to assist in working up the true clay into a fine state with the water and leaving all foreign matter as larger grains or pieces. The mill is discharged and the clay slip is run through a suitably fine lawn or sieve to effect removal of any such foreign matter. In this example the 136 pounds of clay contained 13.6 pounds of material remaining on sieve which was discarded, leaving in the clay slip 122.4 pounds of clay.

The 382.5 pounds aluminum hydrate paste are now thoroughly incorporated into and with the clay slip, and although it can be used direct at the mill, we prefer to dry it at about 50 to 70° C. to obtain an essentially dry product which can be handled dry for packaging and storage.

The product may be also partially dried by any suitable mechanical means or may be air dried by sun heat or in a warm room in thin layers. However if dried at too high a temperature, the aluminum hydroxide becomes inactive; for instance, if the product is dried at 110° C., it would have no value in setting up the enamel. The dried product is preferably pulverized.

A suitable product prepared by drying at 50–66° C. had substantially the following composition:—

| | Percent |
|---|---|
| Clay (calculated to calcined basis) | 68.72 |
| Aluminum oxide (calculated to calcined basis other than that in clay) | 8.59 |
| Free and fixed $H_2O$ + other ignition loss at 950° C | 22.69 |
| | 100.00 |

Effective products have also been prepared in which titanium and zirconium were precipitated along with the aluminum. For example, for use with enamels of the acid-resistant type, it is important to keep the percentage of aluminum down to minimum, but due to fact that aluminum hydroxide is particularly active in setting up enamels it is well to have as much of this hydroxide present as is permissible.

Satisfactory products containing aluminum and titanium hydroxides have been prepared by including sufficient titanium salt, such as the chloride or sulphate, along with the aluminum sulphate in sufficient amount to yield about as much titanium hydroxide as there is of aluminum hydroxide. The product is then washed and processed as described in Example A. The aluminum hydroxide and titanium or other hydroxide can be separately prepared and combined in any desired proportion to produce an improved clay for setting up enamels and the like.

The following mill mix example will show how the product of foregoing Example A can be used, the ingredients being measured parts by weight:—

| | Parts |
|---|---|
| Frit | 100 |
| Improved clay product | 3 |
| Zirconium oxide | 6 |
| Solution of gum tragacanth containing 0.0033% G. T. | 5 |
| Water | 30 |
| Total | 144 |

The gum tragacanth solution is used to maintain a satisfactory degree of dry film strength when the enamel is milled and then applied to the ware, since most enamels with this low clay addition would in absence of gum have a weak film upon drying and would be subject to injury in handling of ware. This defect can be overcome by use of the adhesive solution to strengthen the bond. A trace of formaldehyde can be contained in the gum solution to keep the charge from becoming sour when stored.

As an example illustrating the use of hydrates of metals other than aluminum, we will now give the following in which hydrate of titanium containing some calcium and other compounds was used effectively to produce an improved clay product.

Example B

As the first step there is prepared a stock of hydroxide of metals which has the following composition:

| | Per cent |
|---|---|
| Titanium oxide ($TiO_2$) | 7.21 |
| Silica ($SiO_2$) | 0.13 |
| Iron oxide ($Fe_2O_3$) | 0.07 |
| Alumina ($Al_2O_3$) | 0.07 |
| Zirconia ($ZrO_2$) | 0.12 |
| Calcia (CaO) | 1.00 |
| Magnesia (MgO) | 0.04 |
| Water ($H_2O$) | 91.36 |

This paste was obtained by precipitating the hydroxides by addition of ammonia to a water solution containing salts of the several metals, and, after the precipitate had been washed by settling and decantation to free of water soluble salts, was then obtained by dewatering in a centrifugal machine.

In the analysis, the percentages are set down as oxides, but in the paste these oxides exist as hydrated compounds. 16.75 pounds of clay, preferably Illinois kaolin, are worked up to a slip by suitable means preferably in a ball mill with 100 lbs. of water and milled fine.

There is then added to the clay 27¼ pounds of this heretofore described water-insoluble hydrated metal paste, and the whole is well blended by any suitable means. More water is added if necessary, and then such paste is dried at suitable temperatures to yield a dry product which is preferably disintegrated to a fine powder. This powder may be used effectively to suspend and set up enamels in same manner as the product prepared from clay and aluminum hydroxide paste which we have hereinbefore described.

If the presence of clay is objectionable a paste comprising ingredients according to the analysis given can be used alone in the following manner:

| | Parts by weight |
|---|---|
| Frit | 100.00 |
| Hydroxide paste | 2.87 |
| | 102.87 |

The charge is milled with water along with coloring agents if desired, or with a white opacifier. There is added also a solution of adhesive material such as gum tragacanth to yield about 0.015% gum based on 100 parts of frit. For most purposes, the dry product containing clay will be best suited, but in some cases it will be advantageous to avoid use of clay entirely. The 2.87 parts of this hydroxide paste is equivalent to 0.25% oxide material introduced as the hydroxide and based on 100 parts of frit. The hydroxide material can be produced in still more concentrated form by suitable methods, but care must be taken so as not to destroy its effectiveness by overheating during drying. Generally it is best to dispense the material in paste form as we have described.

As an example of how our invention may be practiced with a mixture of aluminum water-insoluble hydroxide in conjunction with a hydroxide of another metal, we will now set forth the detailed procedure to be followed.

Example C

The first step in this as in other examples is to prepare the water-insoluble metal hydroxide which is effected by precipitating the hydroxides, by means of an alkali, preferably ammonium hydroxide, from a solution of the metal salts in water. The precipitate upon washing and dewatering yields for this example a paste containing the following amounts of metal hydroxide, which although existing as the hydroxides have been calculated to the oxide basis, as follows:

| | Per cent |
|---|---|
| Titanium oxide ($TiO_2$) | 2.20 |
| Iron oxide ($Fe_2O_3$) | 0.01 |
| Silica ($SiO_2$) | 0.04 |
| Alumina ($Al_2O_3$) | 2.50 |
| Calcia (CaO) | 0.40 |
| Magnesia (MgO) | 0.02 |
| Water ($H_2O$) | 94.83 |
| | 100.00 |

Twenty pounds of clay are preferably ball-milled with about 100 parts of water to a fine state, and 48.3 parts of mixed metal hydroxide paste according to the above analysis is thoroughly mixed with the clay by suitable means. The charge is then dried at temperatures and for a time period sufficient to produce a partly dry product in which the hydroxides are in an active state for our purposes. The dried product is preferably then disintegrated to a fine powder.

In the two foregoing Examples B and C, we have shown how the product may be produced from titanium hydroxide containing a substantial proportion of calcium hydroxide, and also how aluminum and titanium may be used together.

We will now set forth two examples showing how to prepare the enamel with the use of the products of our invention.

Example D illustrates the production of a white enamel by use of our improved clay product.

| Batch mix | Parts by weight |
|---|---|
| *Sodium zirconium silicate | 7.15 |
| Quartz | 38.97 |
| Borax | 30.05 |
| Soda ash | 16.82 |
| Sodium nitrate | 3.50 |
| Titanium oxide | 14.00 |
| Antimony oxide | 7.00 |
| Cryolite | 1.00 |
| Fluorspar | 5.00 |
| | 123.49 |

* Sodium zirconium silicate of Kinzie U. S. Patent No. 1,789,311 and as used in batches referred to in this specification had the following composition:

| | Per cent |
|---|---|
| Zirconium oxide ($ZrO_2$) | 55.95 |
| Silica ($SiO_2$) | 28.40 |
| Alumina + $P_2O_5$ ($Al_2O_3 + P_2O_5$) | 1.48 |
| Iron oxide ($Fe_2O_3$) | 0.09 |
| Titanium oxide ($TiO_2$) | 0.10 |
| Sodium oxide ($Na_2O$) | 13.90 |
| | 99.92 |

These ingredients of the batch are intimately mixed and smelted and quenched in water in the usual manner to produce a white opaque frit, which would have the following approximate composition:—

| | Per cent |
|---|---|
| Sodium oxide (Na$_2$O) | 17 |
| Calcium fluoride (CaF$_2$) | 5 |
| Sodium aluminum fluoride (Na$_2$AlF$_6$) | 1 |
| Antimony oxide (Sb$_2$O$_5$) | 7 |
| Boric anhydride (B$_2$O$_3$) | 11 |
| Silica (SiO$_2$) | 41 |
| Titanium oxide (TiO$_2$) | 14 |
| Zirconium oxide (ZrO$_2$) | 4 |
| | 100 |

This white opaque frit may now be prepared for the wet process enameling operation as follows:

| Mill charge | Parts by weight |
|---|---|
| Frit | 100 |
| Zirconium oxide | 6 |
| Improved clay product | 3 |
| Water about | 35 |
| | 144 |

Charge is milled to suitable fineness such as, for example, as represented by a 100 c. c. sample of slip having 12 grams residue upon a 200 mesh sieve after washing the sample through the sieve with water.

The resulting slip is applied in usual manner and dried and finally burned. A second coat may be applied if desired. The result is an enamel of excellent lustre, white color, and good surface.

Example E illustrates the use of metal hydroxides (without clay) in producing a clear enamel or glaze.

| Batch mix | Parts by weight |
|---|---|
| *Sodium zirconium silicate | 7.08 |
| Quartz | 48.52 |
| Borax | 27.05 |
| Soda ash | 26.72 |
| Sodium nitrate | 3.50 |
| Titanium oxide | 13.36 |
| | 126.23 |

*Sodium zirconium silicate of Kinzie U. S. Patent No. 1,789,311 as in Example D.

The batch is mixed and smelted and quenched in water, to form a clear frit which has the following approximate composition:

| | Per cent |
|---|---|
| Sodium oxide (Na$_2$O) | 22.31 |
| Boric anhydride (B$_2$O$_3$) | 9.90 |
| Silica (SiO$_2$) | 50.47 |
| Titanium oxide (TiO$_2$) | 13.36 |
| Zirconium oxide (ZrO$_2$) | 3.96 |
| | 100.00 |

To produce a clear glaze 100 parts of this frit is mixed with 2.87 parts of metal hydrate paste of Example B together with 30 parts of water or enough to make a charge of good wet milling consistency. This charge is then milled to desired fineness which in this example may be very fine, that is, milled to point where practically all frit particles are finer than 325 mesh. The slip may be applied over suitable objects and burned to produce a thin vitreous coating. A coloring agent or stain may be used and is preferably added at the mill to give a desired color or tint to the final coating.

In the appended claims we use the term water-insoluble metal hydroxide or hydroxides to embrace the hydrates or hydroxides of all metals we have mentioned that are active in aiding or increasing the plastic or suspending properties of the clay in setting up of enamel slips, such as aluminum, titanium, zirconium, calcium, iron, magnesium, and tin, or mixtures thereof.

We claim as our invention:

1. The method of making a clay product for use in vitreous enameling and glazing which comprises mixing plastic clay and a water-insoluble metal hydroxide and then partly drying the resulting mixture.

2. The method of making a clay product for use in vitreous enameling and glazing which comprises mixing plastic clay and a water-insoluble metal hydroxide and then partly drying and pulverizing the resulting mixture.

3. The method of making a clay product for use in vitreous enameling and glazing which comprises mixing plastic clay and a mixture of water-insoluble metal hydroxides and then partly drying the resulting mixture.

4. The method of making a clay product for use in vitreous enameling and glazing which comprises mixing plastic clay and a mixture of water-insoluble metal hydroxides including aluminum hydroxide as the major ingredient and then partly drying the resulting mixture.

5. The method of making a clay product for use in vitreous enameling and glazing which comprises mixing plastic clay and a mixture of water-insoluble metal hydroxides including aluminum hydroxide as the major ingredient and then partly drying and pulverizing the resulting mixture.

6. The method of making a clay product for use in vitreous enameling and glazing which comprises preparing a gelatinous flocculent metal hydroxide precipitate, adding same to a plastic clay slip to combine therewith, and then partly drying the resulting charge.

7. The method of making a clay product for use in vitreous enameling and glazing which comprises preparing a gelatinous flocculent metal hydroxide precipitate, adding same to a plastic clay slip to combine therewith, and then partly drying the resulting charge at a temperature from 50° to 70° C.

8. The method of making a clay product for use in vitreous enameling and glazing which comprises preparing gelatinous flocculent aluminum hydroxide precipitate, adding same to a plastic clay slip to combine therewith, and then partly drying the resulting charge.

9. The method of making a clay product for use in vitreous enameling and glazing which comprises preparing gelatinous flocculent aluminum hydroxide precipitate admixed with other water-insoluble metal hydroxides, adding same to a plastic clay slip to combine therewith, and then partly drying the resulting charge.

10. The method of making a clay product for use in vitreous enameling and glazing which comprises impregnating a plastic clay slip with gelatinous flocculent aluminum hydroxide precipitate, then partly drying the mixture at a temperature below 110° C., and finally pulverizing the resulting dried mass.

11. The method of making a clay product for use in vitreous enameling and glazing which comprises impregnating a plastic clay slip with gelatinous flocculent aluminum hydroxide precipitate containing aluminum calculated as alumina about 4 per cent, then partly drying the mixture at a temperature below 110° C., and finally pulverizing the resulting dried mass.

12. A clay product for use in setting up an enamel slip for vitreous enameling and glazing which consists of a plastic clay slip impregnated with a water-insoluble metal hydroxide.

13. A clay product for use in setting up an enamel slip for vitreous enameling and glazing which consists of a plastic clay slip impregnated with a mixture of water-insoluble metal hydroxides.

14. A clay product for use in setting up an enamel slip for vitreous enameling and glazing which consists of a plastic clay slip impregnated with a mixture of water-insoluble metal hydroxides in which aluminum hydroxide is the major ingredient.

15. A clay product for use in setting up an enamel slip for vitreous enameling and glazing characterized as being a partly dried substance comprising plastic clay impregnated with a water-insoluble metal hydroxide.

16. A clay product for use in setting up an enamel slip for vitreous enameling and glazing characterized as being a partly dried powdered substance comprising plastic clay impregnated with a water-insoluble metal hydroxide.

17. The method of preparing vitreous enameling and glazing slips which comprises setting up the said slips by adding a clay product impregnated with a water-insoluble metal hydroxide to the charge at the mill.

18. The method of preparing vitreous enameling and glazing slips which comprises setting up the said slips by adding a clay product impregnated with a water-insoluble metal hydroxide and mixed with an adhesive to the charge at the mill.

19. The method of preparing vitreous enameling and glazing slips which comprises setting up the said slips by adding thereto a clay product impregnated with a mixture of gelatinous flocculent water-insoluble metal hydroxides to hold said glass particles in suspension therein.

20. The method of preparing vitreous enameling and glazing slips which comprises setting up the said slips by adding thereto a gelatinous flocculent water-insoluble metal hydroxide paste mixed with an adhesive to hold said glass particles in suspension therein.

CHARLES J. KINZIE.
CHARLES H. COMMONS, JR.
DONALD S. HAKE.